US010246081B2

(12) United States Patent
Toyama (10) Patent No.: US 10,246,081 B2
(45) Date of Patent: Apr. 2, 2019

(54) TRANSMISSION FOR ENGAGING A DRIVING GEAR OF A FIRST GEAR GROUP BEFORE SELECTING A DRIVING GEAR OF A SECOND GEAR GROUP (71) Applicant: HONDA MOTOR CO., LTD., Tokyo (JP)

(72) Inventor: Naoki Toyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 231 days.

(21) Appl. No.: 15/286,576

(22) Filed: Oct. 6, 2016

(65) Prior Publication Data
US 2017/0096137 A1    Apr. 6, 2017

(30) Foreign Application Priority Data

Oct. 6, 2015 (JP) .................. 2015-198944

(51) Int. Cl.
B60W 20/30 (2016.01)
B60K 6/365 (2007.10)
(Continued)

(52) U.S. Cl.
CPC ............ *B60W 20/30* (2013.01); *B60K 6/365* (2013.01); *B60K 6/48* (2013.01); *B60K 6/547* (2013.01);
(Continued)

(58) Field of Classification Search
CPC .... B60W 20/30; B60W 20/40; B60W 10/111; B60W 10/113; B60K 6/00; B60K 6/365;
(Continued)

(56) References Cited

U.S. PATENT DOCUMENTS

2006/0169505 A1* 8/2006 Adamis .................. B60K 6/387
180/65.225
2010/0009805 A1* 1/2010 Bachmann ............. B60K 6/365
477/5
(Continued)

FOREIGN PATENT DOCUMENTS

CN    101978188    2/2011
CN    102858577    1/2013
(Continued)

OTHER PUBLICATIONS

Japanese Office Action for corresponding JP Application No. 2015-198944, dated Apr. 25, 2017 (w/ English machine translation).
(Continued)

Primary Examiner — Richard A Goldman
(74) Attorney, Agent, or Firm — Mori & Ward, LLP (57) ABSTRACT A transmission includes a drive source, a first input shaft, a second input shaft, a first gear group, a first synchronous engagement mechanism, a second gear group, a second synchronous engagement mechanism, an output shaft, and circuitry. The circuitry is configured to control the first synchronous engagement mechanism to synchronously engage one of the at least one first driving gear with the first input shaft before selecting one of the at least one second driving gear and connecting the second input shaft to the drive source through a second connection and disconnection device so as to move a vehicle.

12 Claims, 9 Drawing Sheets (51) Int. Cl.
*B60K 6/48* (2007.10)
*B60K 6/547* (2007.10)
*B60W 10/111* (2012.01)
*F16H 3/00* (2006.01)
*F16H 3/093* (2006.01)
*F16H 3/72* (2006.01)
*F16H 37/06* (2006.01)
*F16H 61/04* (2006.01)
*F16H 61/688* (2006.01)
*F16H 57/00* (2012.01)
*B60W 10/113* (2012.01)

(52) U.S. Cl.
CPC ......... *B60W 10/111* (2013.01); *B60W 10/113* (2013.01); *F16H 3/006* (2013.01); *F16H 3/093* (2013.01); *F16H 3/724* (2013.01); *F16H 37/065* (2013.01); *F16H 57/0006* (2013.01); *F16H 61/0403* (2013.01); *F16H 61/688* (2013.01); *B60K 2006/4816* (2013.01); *B60K 2006/4825* (2013.01); *B60Y 2200/92* (2013.01); *B60Y 2300/19* (2013.01); *B60Y 2300/73* (2013.01); *B60Y 2400/73* (2013.01); *F16H 2003/0931* (2013.01); *F16H 2057/0012* (2013.01); *F16H 2200/0052* (2013.01); *F16H 2200/0056* (2013.01); *Y02T 10/6221* (2013.01); *Y02T 10/6252* (2013.01); *Y02T 10/6256* (2013.01); *Y10S 903/945* (2013.01)

(58) Field of Classification Search
CPC ........ B60K 6/48; B60K 6/547; B60K 6/3871; B60K 2006/4816; B60K 2006/4825; B60K 2006/4808; B60K 2006/268; F16H 3/006; F16H 3/093; F16H 3/724; F16H 37/065; F16H 57/0006; F16H 61/0403; F16H 61/688; F16H 2306/18; F16H 2003/0931; F16H 2200/0052; F16H 2200/0056; B60Y 2200/92; B60Y 2300/19; B60Y 2300/73; B60Y 2400/73; Y02T 10/6221; Y02T 10/6252; Y02T 10/6256; Y10S 903/945
USPC .......... 701/3, 4, 5, 6, 7, 8, 10, 22, 454, 523, 701/180; 903/902, 906, 909, 945, 946; 180/65.265, 65.22, 65.225, 65.25, 65, 21; 244/17, 13, 180; 356/437, 326, 303; 382/100; 250/339.1, 339.13, 339.06
See application file for complete search history.

(56) References Cited

U.S. PATENT DOCUMENTS

| | | | |
|---|---|---|---|
| 2011/0073393 A1* | 3/2011 | Sasaki | B60K 6/387 180/65.22 |
| 2012/0310462 A1* | 12/2012 | Kuroda | B60K 6/48 701/22 |
| 2013/0045833 A1* | 2/2013 | Okubo | B60K 6/387 477/5 |
| 2013/0079967 A1* | 3/2013 | Terakawa | B60W 10/02 701/22 |
| 2013/0103242 A1* | 4/2013 | Takeuchi | B60K 6/36 701/22 |
| 2013/0345010 A1* | 12/2013 | Kaltenbach | B60K 6/365 475/5 |
| 2013/0345018 A1* | 12/2013 | Kaltenbach | B60K 6/48 477/5 |
| 2015/0006000 A1* | 1/2015 | Kawata | B60K 6/48 701/22 |
| 2015/0321658 A1* | 11/2015 | Hansson | B60K 6/48 701/22 |
| 2016/0023653 A1* | 1/2016 | Takahashi | B60K 6/387 701/22 |
| 2016/0176280 A1* | 6/2016 | Kaltenbach | B60K 6/365 475/5 |
| 2018/0022207 A1* | 1/2018 | Eo | B60K 6/36 74/661 |
| 2018/0029461 A1* | 2/2018 | Choi | B60K 6/36 |
| 2018/0072319 A1* | 3/2018 | Iwashita | B60K 6/26 |
| 2018/0154757 A1* | 6/2018 | Lee | B60K 6/365 |
| 2018/0163793 A1* | 6/2018 | Jeong | F16D 25/0638 |
| 2018/0178779 A1* | 6/2018 | Inagawa | B60W 20/40 |

FOREIGN PATENT DOCUMENTS

| | | |
|---|---|---|
| JP | 62-237145 | 10/1987 |
| JP | 2011-020575 | 2/2011 |
| JP | WO2011/136235 | 11/2011 |
| JP | 2012-81875 | 4/2012 |
| JP | 2015-48065 | 3/2015 |

OTHER PUBLICATIONS

Japanese Office Action for corresponding JP Application No. 2015-198944, dated Oct. 10, 2017 (w/ English machine translation).

Chinese Office Action for corresponding CN Application No. 201610838883.2, dated Sep. 4, 2018 (w/ English machine translation).

* cited by examiner

TRANSMISSION FOR ENGAGING A DRIVING GEAR OF A FIRST GEAR GROUP BEFORE SELECTING A DRIVING GEAR OF A SECOND GEAR GROUP

CROSS-REFERENCE TO RELATED APPLICATIONS

The present application claims priority under 35 U. S. C. § 119 to Japanese Patent Application No. 2015-198944, filed on Oct. 6, 2015. The contents of this application are incorporated herein by reference in their entirety.

BACKGROUND OF THE INVENTION

Field of the Invention

The present invention relates to a transmission.

Discussion of the Background

A dual clutch type transmission (twin clutch type transmission) includes, as a basic configuration, a first input shaft on which a plurality of driving gears (hereinafter, referred also to as speed change gear or gears) of an odd number shift stage are arranged in a relatively rotatable manner, a second input shaft on which a plurality of driving gears of an even number shift stage are arranged in a relatively rotatable manner, a first synchromesh mechanism or a second synchromesh mechanism for allowing each of the driving gears to be synchronously engaged with the first input shaft or the second input shaft to which each of the driving gears belongs, an output shaft on which a plurality of driven gears configured to be engaged with the driving gears of the odd number shift stage and the diving gears of the even number shift stage are arranged, and a first clutch or a second clutch for connecting and disconnecting drive force between a drive source and the first input shaft or the second input shaft.

A speed change process of the dual clutch type transmission is composed of a shift preparation (pre-shift), a change-over of a clutch (changeover of clutch connection) and a shift release. The shift preparation is a state of allowing the speed change gear of a next shift stage (hereinafter, referred also to a target shift stage) to be previously engaged with the input shaft (hereinafter, referred also to as another shaft) which does not contribute to current traveling, during a period in which the speed change gear of a current shift stage is synchronously engaged with the input shaft (hereinafter, referred also to a current traveling shaft) which contributes to the current traveling. Further, the changeover of the clutch is a state of releasing the clutch of the current traveling shaft (hereinafter, referred also to a current stage clutch) and fastening the clutch of another shaft (hereinafter, referred also to a next stage clutch) thereby to have the target shift stage fixed as the current shift stage. Moreover, the shift release is a state of returning the synchromesh mechanism of a previous shift stage (hereinafter, referred also to a former shift stage) to a neutral position thereby to release the synchronous engagement of the speed change gear of the former shift stage with another shaft.

By the way, there is known the dual clutch type transmission which has a motor combined with a shaft end of the first input shaft on the downstream side of the first clutch in order to assist drive force of an engine by torque of the motor or to allow a vehicle to travel only by the torque of the motor (see Japanese Patent Application Laid-Open Publication No. 2011-20575, for example)

In the dual clutch type transmission provided with the motor, when the first synchromesh mechanism is in the neutral state and the second synchromesh mechanism in an in-gear state, the second clutch is fastened and the drive force of the engine is transmitted to drive wheels through the second input shaft so as to move the vehicle forward.

Further, during the traveling of the vehicle, the first clutch is fastened and electric power is generated through the first input shaft by the drive force of the engine whereby to allow a battery to be charged with the electric power. To put it briefly, the vehicle can travel in a state of fastening each of the first clutch and the second clutch at the same time.

Accordingly, for example, during traveling at the even number shift stage by fastening the second clutch, in the case where remaining capacity of the battery is small, it is possible to fasten the first clutch and drive the motor as a generator by the drive force of the engine thereby to charge the battery. Further, when the vehicle is stopped in the neutral states of the first and second synchromesh mechanisms, it is possible to shift a second speed gear to the second input shaft and fasten the second clutch during charging the battery by fastening the first clutch, so as to start the vehicle at the second shift stage.

Like this, in the above dual clutch type transmission, the fastening and release of the clutches are performed frequently during the traveling and stopping of the vehicle. FIG. 7B is a graph showing time series datum at the time of rotation of the engine and the second clutch and each of time series datum of rotation amplitude of the second clutch, torque amplitude of a drive shaft and vibration amplitude of the vehicle body in the case where the second clutch has been fastened and the vehicle has been started at the second shift stage during the stopping of the vehicle when each of the first and second synchromesh mechanisms is in the neutral position. Herein, the time series datum of the rotation of each of the engine and the second clutch are indicated by time series datum of rotational frequency, and each of the time series datum of the rotation amplitude of the second clutch, the torque amplitude of the drive shaft and the vibration amplitude of the vehicle body is indicated by a time series data of fluctuation in which each of time series datum of rotational frequency, torque and vibration is extracted by a band pass filter.

It is apparent from the drawing that, when the second clutch starts to be fastened at the time t1, the drive force (rotation) from the engine fluctuates and becomes the rotational fluctuation of the second clutch thereby to be transmitted to the drive shaft. In other words, it is clear that the rotational fluctuation of the drive force attendant on the clutch fastening is easily subject to being directly transmitted to the drive shaft.

By the way, there is proposed a method for suppressing the rotational fluctuation of the drive force attendant on the clutch fastening, by the torque of the motor (for example, see [0082] to [0084] of Japanese Patent Application Laid-Open Publication No. 2011-20575).

SUMMARY OF THE INVENTION

According to one aspect of the present invention, a transmission includes a drive source, a first input shaft, a second input shaft, a first gear group, a first synchronous engagement mechanism, a second gear group, a second synchronous engagement mechanism, an output shaft, and a control device. The drive source generates drive force to drive a vehicle. The first input shaft is selectively connected to the drive source through a first connection and disconnection means. The second input shaft is selectively connected to the drive source through a second connection and disconnection means. The first gear group includes one or a plurality of driving gears provided on the first input shaft in a relatively rotatable manner. The first synchronous engagement mechanism synchronously engages one driving gear of the first gear group with the first input shaft selectively. The second gear group includes one or a plurality of driving gears provided on the second input shaft in a relatively rotatable manner. The second synchronous engagement mechanism synchronously engages one driving gear of the second gear group with the second input shaft selectively. One or a plurality of driven gears to be engaged with each of the driving gears belonging to the first and second gear groups are provided on the output shaft in a relatively non-rotatable manner. The control device controls the first and second synchronous engagement mechanisms. The control device is configured to control the first synchronous engagement mechanism so as to synchronously engage one driving gear of the first gear group with the first input shaft previously when the vehicle is started by selecting one driving gear of the second gear group and fastening the second connection and disconnection means.

According to another aspect of the present invention, a transmission includes a drive source, a first input shaft, a second input shaft, a first gear group, a first synchronous engagement mechanism, a second gear group, a second synchronous engagement mechanism, an output shaft, and circuitry. The drive source generates drive force to drive a vehicle. The first input shaft is connected to the drive source through a first connection and disconnection device. The second input shaft is connected to the drive source through a second connection and disconnection device. The first gear group includes at least one first driving gear provided on the first input shaft to be relatively rotatable with respect to the first input shaft. The first synchronous engagement mechanism synchronously engages one of the at least one first driving gear with the first input shaft. The second gear group includes at least one second driving gear provided on the second input shaft to be relatively rotatable with respect to the second input shaft. The second synchronous engagement mechanism synchronously engages one of the at least one second driving gear with the second input shaft. At least one driven gear is provided on the output shaft to be rotatable together with the output shaft. The at least one driven gear is engaged with each of the at least one first driving gear in the first gear group and with each of the at least one second driving gear in the second gear group. The circuitry is configured to control the first synchronous engagement mechanism to synchronously engage the one of the at least one first driving gear with the first input shaft before selecting the one of the at least one second driving gear and connecting the second input shaft to the drive source through the second connection and disconnection device so as to move the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
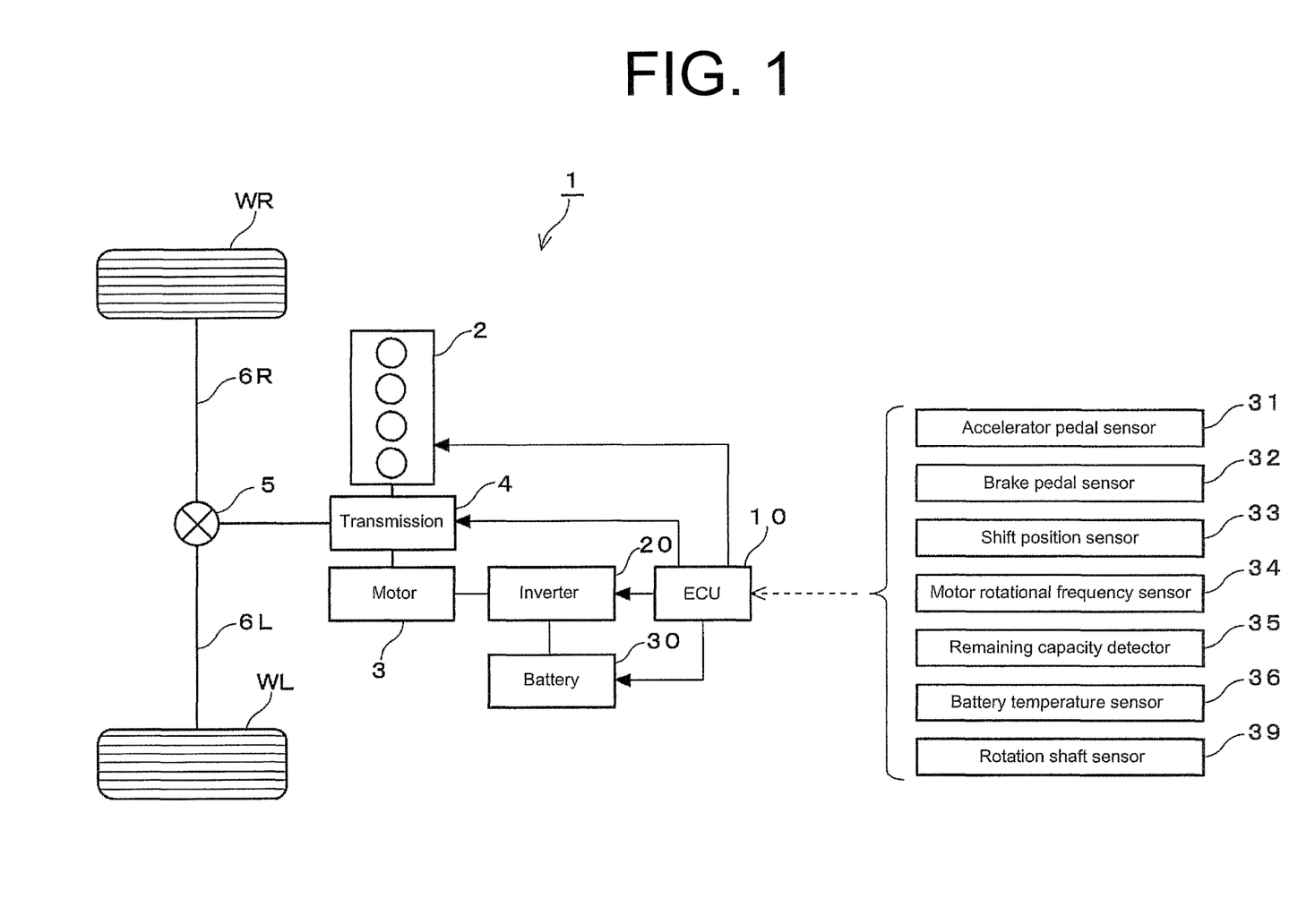
FIG. 1 is a schematic diagram showing an example of the configuration of a vehicle provided with a transmission in accordance with an embodiment of the present invention.

Hereunder, an embodiment of the present invention will be explained in detail with reference to accompanying drawings. FIG. 1 is a schematic diagram showing an example of the configuration of a vehicle provided with a transmission 4 in accordance with an embodiment of the present invention.

A vehicle 1 of this embodiment is a vehicle of a hybrid powered automobile which is provided with an engine 2 and a motor 3 as a drive source. This vehicle 1 includes an inverter 20 for controlling the motor 3, a battery 30 for supplying electric power to the motor 3, a transmission 4 for changing a rotational frequency of drive force from the drive source to a desired rotational frequency, a differential mechanism 5 for distributing the drive force transmitted from the transmission 4 to left and right drive wheels WL, WR, left and right drive shafts 6L, 6R each for transmitting the drive force distributed by the differential mechanism 5 to the left and right drive wheels WL, WR, and the left and right drive wheels WL, WR for converting the drive force transmitted by the left and right drive shafts 6L, 6R into propulsion force of the vehicle.

Herein, the motor 3 includes each function as an electric motor and a generator. The battery 30 is an accumulator which is able to be charged and discharged in a reversible manner, and includes a secondary battery and a capacitor. In addition, the engine 2 may be an internal combustion engine which converts combustion energy into rotation energy, and it does not matter what kind of fuel is used and whether or not a supercharger is provided.

Further, the vehicle 1 has an electronic control unit (ECU) 10 for controlling each of the engine 2, the transmission 4, the inverter 20 and the battery 30. The electronic control unit 10 may be constituted not only as one unit for a plurality of objects to be controlled but also as one unit for a single object to be controlled. For example, the electronic control unit may be constituted by a plurality of ECUs such as an engine ECU for controlling the engine 2, a motor ECU for controlling the motor 3 and the inverter 20, a battery ECU for controlling the battery 30, an AT-ECU for controlling the transmission 4, etc. The electronic control unit (ECU) 10 of this embodiment is constituted as one unit for controlling not only the engine 2 but also the inverter 20, the battery 30 and the transmission 4.

The electronic control unit 10, according to various driving conditions, is configured to control the vehicle such that motor only traveling (EV traveling) which uses only the motor 3 as the drive source is performed, or such that engine only traveling which uses only the engine 2 as the drive source is performed, or such that cooperative traveling (HEV traveling) using both of the engine 2 and the motor 3 as the drive source is performed.

Further, various measuring signals including an accelerator opening degree from an accelerator pedal sensor 31, a brake pedal treading amount from a brake pedal sensor 32, a gear stage (current shift stage) from a shift position sensor 33, a motor rotational frequency from a motor rotational frequency sensor 34, a remaining capacity (SOC) of the battery 30 from a remaining capacity detector 35, a temperature of the battery 30 from a battery temperature sensor 36, and speed of shafts such as an inner main shaft IMS, an outer main shaft OMS, a counter shaft CS, etc. from a sensor 39 of rotation shaft are configured to be inputted, as control parameters, to the electronic control unit 10 at real time or as the need arises.

At the time of the cooperative traveling of the engine 2 and the motor 3 or the motor only traveling of the motor 3 only, the motor 3 functions as the electric motor which generates the drive force for allowing the vehicle 1 to travel while utilizing the electric energy of the battery 30, and at the time of deceleration of the vehicle 1, it functions as the generator for generating the electric power by regeneration of the motor 3. At the time of regeneration of the motor 3, the battery 30 is charged with electric power (regeneration energy) generated by the motor 3.

The motor 3, for example, is three-phase brushless motor which is constituted by a rotator (rotor) 3a (FIG. 2) composed of a permanent magnet, and a stationary part (stator) 3b (FIG. 2) provided with winding coils (not shown) of three phases (U-phase, V-phase, W-phase) in such a way as to surround the rotor 3a. The electronic control unit 10 detects a position of a magnetic pole (position of N pole or S pole) of the rotor 3a and switches, in order, the directions (excitation direction) of an interphase current (for example, between U-phase and V-phase) flowing through each of the winding coils in accordance with the position of the magnetic pole of the rotor 3a so as to rotate the rotor 3a in the fixed direction.

Figure 2:
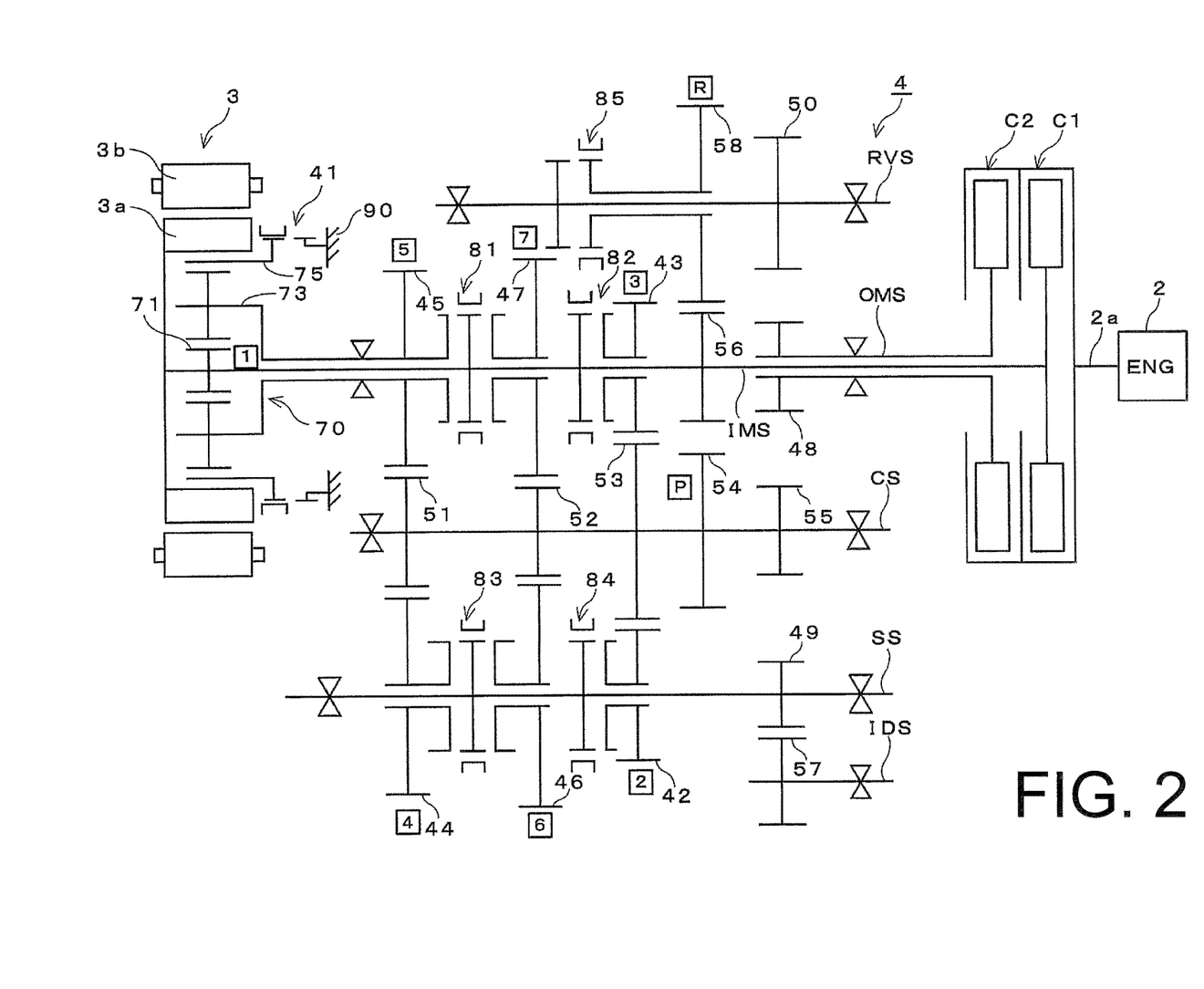
FIG. 2 is a skeleton diagram of the transmission shown in FIG. 1.

Next, the configuration of the transmission 4 provided in the vehicle of this embodiment will be explained. FIG. 2 is a skeleton diagram of the transmission 4 shown in FIG. 1. The transmission 4 is a parallel axis type transmission of forward seven speeds and reverse one speed, and is a dry dual clutch type transmission (twin clutch type transmission).

The transmission 4 is provided, as a shaft, with the inner main shaft (first input shaft) IMS connected to a crankshaft 2a, serving as an engine output shaft of the engine 2, and the motor 3, an outer main shaft (second input shaft) OMS forming an outer cylinder of the first input shaft IMS, a secondary shaft (second input shaft) SS, an idle shaft IDS and a reverse shaft RVS each extending in parallel with the first input shaft IMS, and the counter shaft CS extending in parallel with these shafts and serving as an output shaft.

Among these shafts, the outer main shaft OMS is arranged to be engaged continuously with the reverse shaft RVS and the secondary shaft SS through the idle shaft IDS, and the counter shaft CS is arranged further to be engaged continuously with the differential mechanism 5 (FIG. 1).

Further, the transmission 4 includes a first clutch C1 for an odd number shift stage and a second clutch C2 for an even number shift stage. The first and second clutches C1, C2 are dry clutches. The first clutch C1 is combined with the first input shaft IMS. The second clutch C2 is combined with the outer main shaft OMS (a part of the second input shaft) and connected from a gear 48 fixed on the outer main shaft OMS, through the idle shaft IDS, to the reverse shaft RVS and the secondary shaft SS (a part of the second input shaft).

In a predetermined position of the first input shaft IMS in the vicinity of the motor 3, a sun gear 71 of a planetary gear mechanism 70 is arranged in a fixedly secured manner. Moreover, on an outer circumference of the first input shaft IMS, there are arranged, in order from the left side of FIG. 2, a carrier 73 of the planetary gear mechanism 70, a fifth speed driving gear 45, a seventh speed driving gear 47 and a third speed driving gear 43. Each of the fifth speed driving gear 45, the seventh speed driving gear 47 and the third speed driving gear 43 is relatively rotatable with respect to the first input shaft IMS. The fifth speed driving gear 45 is connected to the carrier 73 of the planetary gear mechanism 70 and used also as a first speed driving gear.

Further, on the first input shaft IMS, a fifth-seventh speed synchromesh mechanism (first synchronous engagement mechanism) 81 is provided between the fifth speed driving gear 45 and the seventh speed driving gear 47 in an axially slidable manner, and a third speed synchromesh mechanism (first synchronous engagement mechanism) 82 corresponding to the third speed driving gear 43 is provided in an axially slidable manner. When the synchromesh mechanism (first synchronous engagement mechanism) corresponding to the desired gear stage is slid and engaged with an engagement device of the desired gear stage, the gear stage is fastened to the first input shaft IMS. Each of the driving gears arranged on the outer circumference of the first input shaft INS in a relatively rotatable manner is engaged with each of corresponding driven gears provided on the counter shaft CS, thereby to rotationally drive the counter shaft CS.

On an outer circumference of the secondary shaft (second input shaft) SS, in order from the left side of FIG. 2, a fourth speed driving gear 44, a sixth speed driving gear 46 and a second speed driving gear 42 are arranged in a relatively rotatable manner. Moreover, on the secondary shaft SS, a fourth-sixth speed synchromesh mechanism (second synchronous engagement mechanism) 83 is provided between the fourth speed driving gear 44 and the sixth speed driving gear 46 in an axially slidable manner, and a second speed synchromesh mechanism (second synchronous engagement mechanism) 84 corresponding to the second speed driving gear 42 is provided in an axially slidable manner. In this case, also when the synchromesh mechanism (second synchronous engagement mechanism) corresponding to the desired gear stage is slid and engaged with an engagement device of the desired gear stage, the gear stage is fastened to the secondary shaft (second input shaft) SS.

Each of the driving gears arranged on the outer circumference of the secondary shaft SS in a relatively rotatable manner is also engaged with each of corresponding driven gears provided on the counter shaft CS thereby to rotationally drive the counter shaft CS. Herein, a gear 49 fixedly secured to the secondary shaft SS is engaged with a gear 57 on the idle shaft IDS and combined from the idle shaft IDS through the outer main shaft OMS with the second clutch C2.

A reverse driving gear 58 is arranged on an outer circumference of the reverse shaft RVS in a relatively rotatable manner. Moreover, on the reverse shaft RVS, a reverse synchromesh mechanism 85 corresponding to the reverse driving gear 58 is provided in an axially slidable manner, and a gear 50 which is engaged with the idle shaft IDS is fixed.

In the case of reverse traveling, the synchromesh mechanism 85 is slid in the left direction thereby to synchronously engage the reverse driving gear 58 with the reverse shaft RVS, and then a brake 41 to be referred to later is operated. At that time, when the second clutch C2 is connected, the rotation of the second clutch C2 is transmitted through the outer main shaft OMS and the idle shaft IDS to the reverse shaft RVS, so that the reverse driving gear 58 is rotated. Since the reverse driving gear 58 is engaged with a gear 56 provided on the first input shaft INS, the first input shaft IMS is rotated in the opposite direction to the forward traveling when the reverse driving gear 58 is rotated. The rotation in the opposite direction of the first input shaft INS is transmitted to the counter shaft CS through the sun gear 71 and the carrier 73 of the planetary gear mechanism 70, and the gear (fifth speed driving gear) 45 connected to the carrier 73.

On the counter shaft CS, in order from the left side of FIG. 2, there are fixedly arranged a fourth-fifth speed driven gear 51, a sixth-seventh speed driven gear 52, a second-third speed driven gear 53, a parking gear 54 and a final driving gear 55. The final driving gear 55 is configured to be engaged with a differential ring gear (not shown) of the differential mechanism 5 so that the rotation of an output shaft of the counter shaft CS is transmitted to an input shaft (namely, vehicle propeller shaft) of the differential mechanism 5. In addition, on the ring gear 75 of the planetary gear mechanism 70 there is provided the brake 41 for stopping the rotation of the ring gear 75.

In the transmission 4 of the above configuration, when a synchro sleeve of the fifth-seventh speed synchromesh mechanism 81 is slid in the left direction, the fifth speed driving gear 45 is engaged with the first input shaft IMS so that the shift stage of the fifth speed is selected. When being slid in the right direction, the seventh speed driving gear 47 is engaged with the first input shaft IMS so that the shift stage of the seventh speed is selected. Moreover, when a synchro sleeve of the third speed synchromesh mechanism 82 is slid in the right direction, the third speed driving gear 43 is engaged with the first input shaft IMS so that the shift stage of the third speed is selected. Further, when the synchro sleeve of the fifth-seventh speed synchromesh mechanism 81 is slid in the left direction in a state where a synchro sleeve of the brake 41 is slid in the right direction and the rotation of the ring gear 75 is stopped, the shift stage of the first speed is selected. In other words, a speed reduction ratio of a first speed stage is a speed reduction ratio by multiplying a speed reduction ratio of the planetary gear mechanism 70 and a speed reduction ratio of the five speed stage together. Like this, when the first clutch C1 is engaged in a state where the driving gear stage of the odd number is selected, the transmission 4 is set to the odd number shift stage (first speed, third speed, fifth speed or seventh speed).

When a synchro sleeve of the fourth-sixth speed synchromesh mechanism 83 is slid in the left direction, the fourth speed drive gear 44 is engaged with the secondary shaft SS, and when being slid in the right direction, the sixth speed drive gear 46 is engaged with the secondary shaft SS.

Moreover, when a synchro sleeve of the second speed synchromesh mechanism 84 is slid in the right direction, the second speed driving gear 42 is engaged with the secondary shaft SS. Like this, when the second clutch C2 is engaged in a state where the drive gear stage of the even number is selected, the transmission 4 is set to the even number shift stage (second speed, fourth speed or sixth speed).

Further, when a synchro sleeve of the reverse synchromesh mechanism 85 is slid in the left direction in a state where the synchro sleeve of the brake 41 is slid in the right direction and the rotation of the ring gear 75 is stopped, the transmission is set to the reverse stage.

Figure 3:
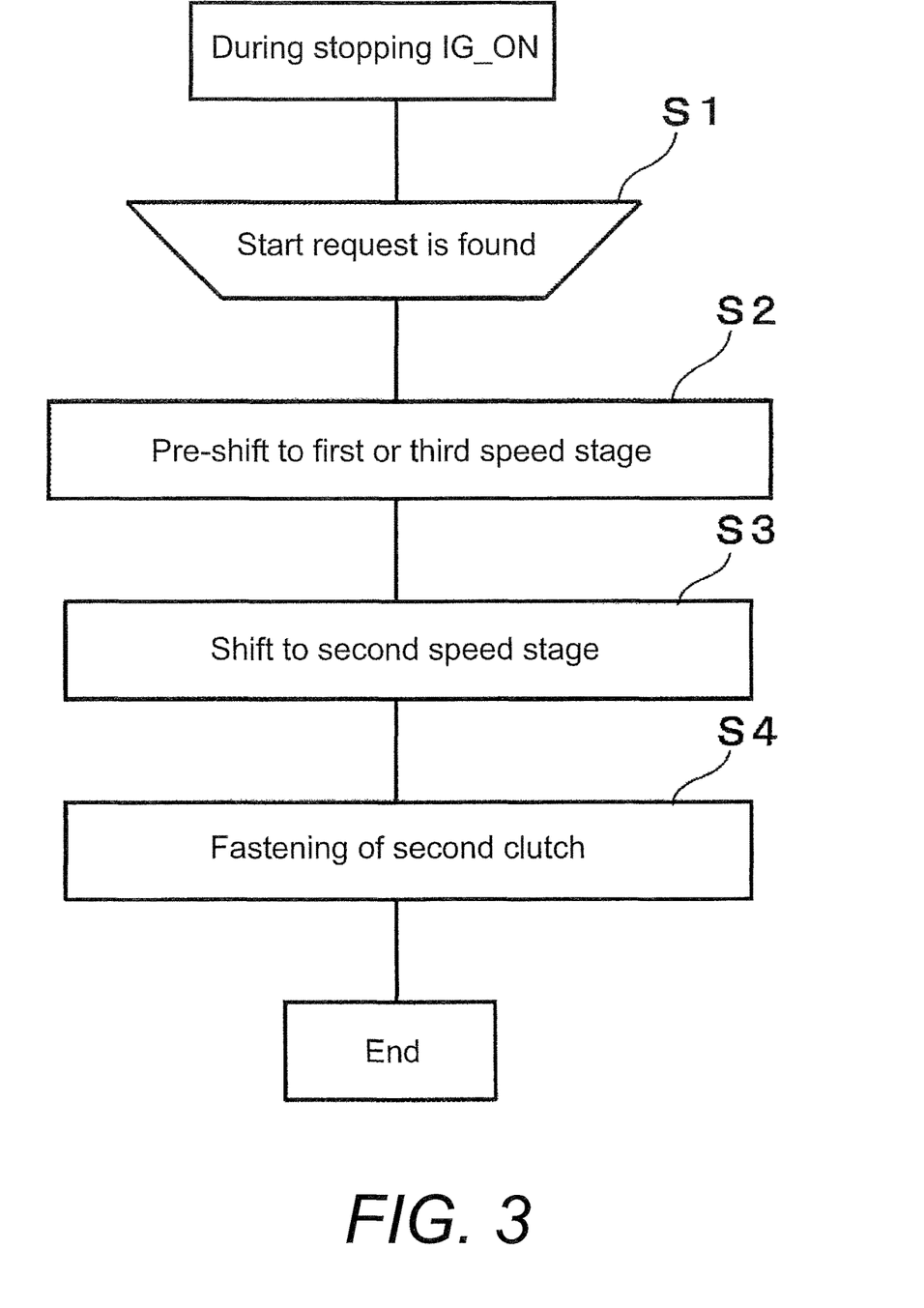
FIG. 3 is a flow chart indicating a start control when starting the vehicle at a second speed stage from a stop state thereof.

FIG. 3 is a flowchart indicating a start control when starting the vehicle at the second speed stage from a stop state thereof.

When an ignition key IG is turned on during stopping of the vehicle 1, the electronic control unit 10 performs the processing of a step S1.

In the step S1, whether or not a request of start from the driver is in existence is judged. The electronic control unit 10 captures a signal from the shift position sensor 33 and judges that the request of the start is in existence if the current shift position is a traveling position such as a D range and the like, whereby to execute the processing of a step S2. When the shift position is other than the traveling position, it waits until the start request from the driver is made.

In the step S2, the pre-shift control to the first speed stage or a third speed stage is executed.

In the case of being pre-shifted to the first speed stage, the electronic control unit 10 shifts the synchro sleeve of the brake 41 shown in FIG. 2 in the right direction thereby to engage the ring gear 75 with a casing 90. Moreover, the synchro sleeve of the fifth-seventh synchromesh mechanism 81 is shifted in the left direction thereby to synchronously engage the fifth speed drive gear with the inner main shaft IMS. Consequently, the first speed stage is pre-shifted.

On the other hand, in the case of being pre-shifted to the third speed stage, the electronic control unit 10 shifts the synchro sleeve of the third synchromesh mechanism 82 shown in FIG. 2 in the right direction thereby to synchronously engage the third speed drive gear with the inner main shaft INS. Consequently, the third speed stage is pre-shifted.

In a step S3, the shift to the second speed stage is executed. The electronic control unit 10 shifts the synchro sleeve of the second synchromesh mechanism 84 shown in FIG. 2 in the right direction thereby to synchronously engage the second speed drive gear 42 with the secondary shaft SS.

In a step S4, the second clutch C2 is fastened. Consequently, the vehicle 1 is started at the second speed stage.

Figure 4:
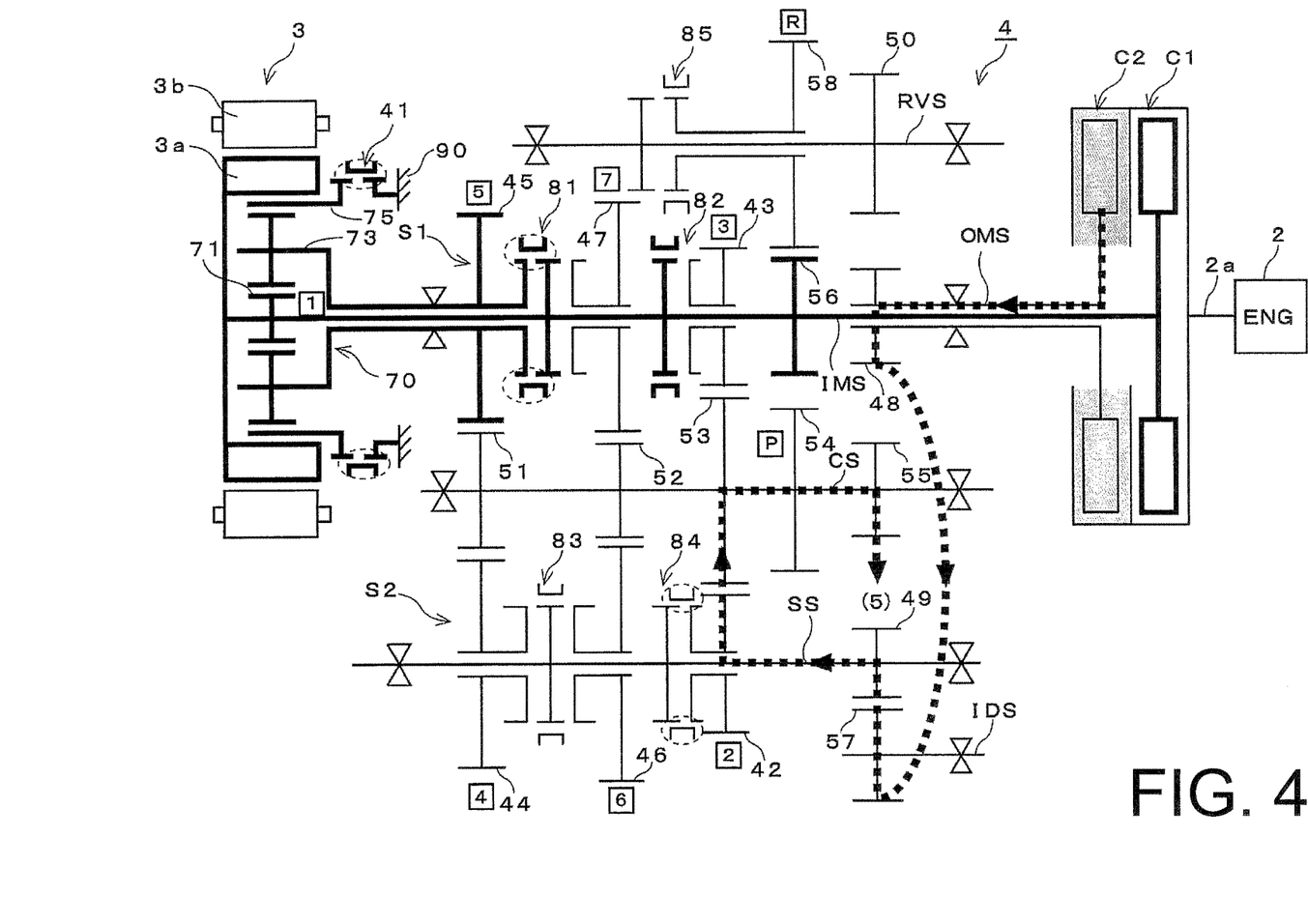
FIG. 4 is an explanatory diagram of torque flow when the vehicle is started at the second speed stage from a state of being pre-shifted to a first speed stage.

FIG. 4 is an explanatory diagram of torque flow when the vehicle 1 is started at the second speed stage from a state of being pre-shifted to the first speed stage. In addition, the torque flow is indicated by a dotted line. The same shall apply hereinafter.

In the case of being pre-shifted to the first speed stage, a part located downstream from the first clutch C1 as indicated by a thick line in FIG. 4, namely, the inner main shaft IMS, the sun gear 71, the rotor 3a, the ring gear 75, the carrier 73, the fifth speed driving gear 45, the fifth-seventh speed synchromesh mechanism 81, the third speed synchromesh mechanism 82 and the gear 56 are connected to the counter shaft CS through the fourth-fifth driven gear 51. The counter shaft CS is connected to the secondary shaft SS through the second-third driven gear 53. In other words, when being pre-sifted to the first speed stage, the part indicated by a thick line becomes load inertia relative to a drive system (second drive system) located downstream from the second clutch C2, so that the load inertia relative to the second drive system is increased. With increase of the load inertia relative to the second drive system, although the detail will be explained later, a characteristic vibration frequency of the second drive system is shifted to a low frequency range, so that a gain of vibration level is reduced in a higher frequency range than the characteristic vibration frequency. Therefore, the rotational fluctuation of the drive force attendant on the fastening of the second clutch C2 can be attenuated properly. As a result, the vibration generated in the vehicle body attendant on the fastening of the clutch can be properly suppressed.

Figure 5:
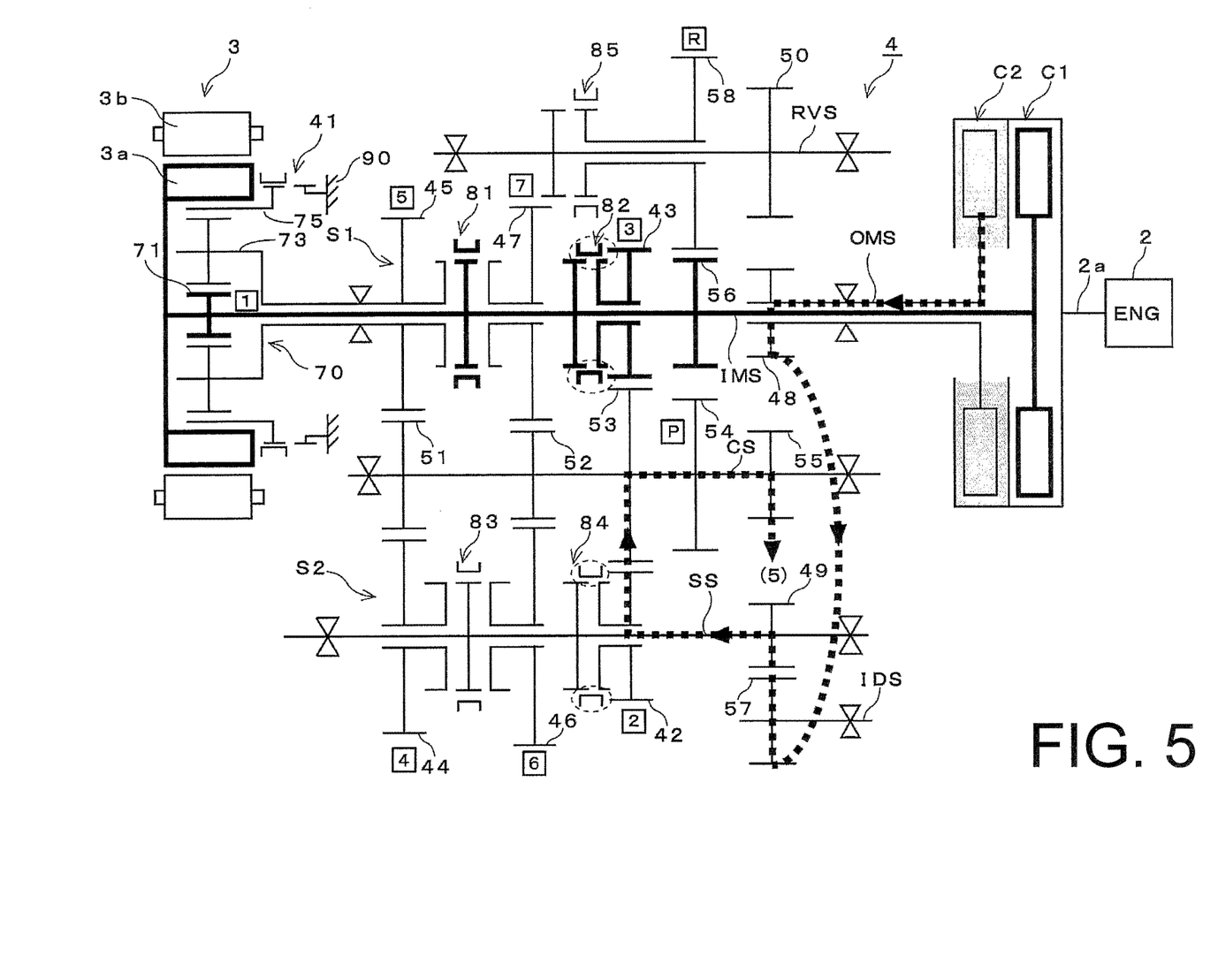
FIG. 5 is an explanatory diagram of the torque flow when the vehicle is started at the second speed stage from a state of being pre-shifted to a third speed stage.

Similarly, FIG. 5 is an explanatory diagram of torque flow when the vehicle 1 is started at the second speed stage from a state of being pre-shifted to the third speed stage.

In the case of being pre-shifted to the third speed stage, a part located downstream from the first clutch C1 as indicated by a thick line in FIG. 5, namely, the inner main shaft IMS, the sun gear 71, the rotor 3a, the fifth-seventh speed synchromesh mechanism 81, the third speed synchromesh mechanism 82, the third speed drive gear 43 and the gear 56 are connected to the secondary shaft SS through the second-third driven gear 53. The counter shaft CS is connected to the secondary shaft SS through the second-third driven gear 53. Consequently, the load inertia relative to the second drive system located downstream from the second clutch C2 is increased and the characteristic vibration frequency of the drive system located downstream from the second clutch C2 is reduced, so that the rotational fluctuation of the drive force attendant on the fastening of the second clutch C2 can be attenuated properly. As a result, the vibration generated in the vehicle body attendant on the fastening of the clutch can be properly suppressed.

Figure 6:
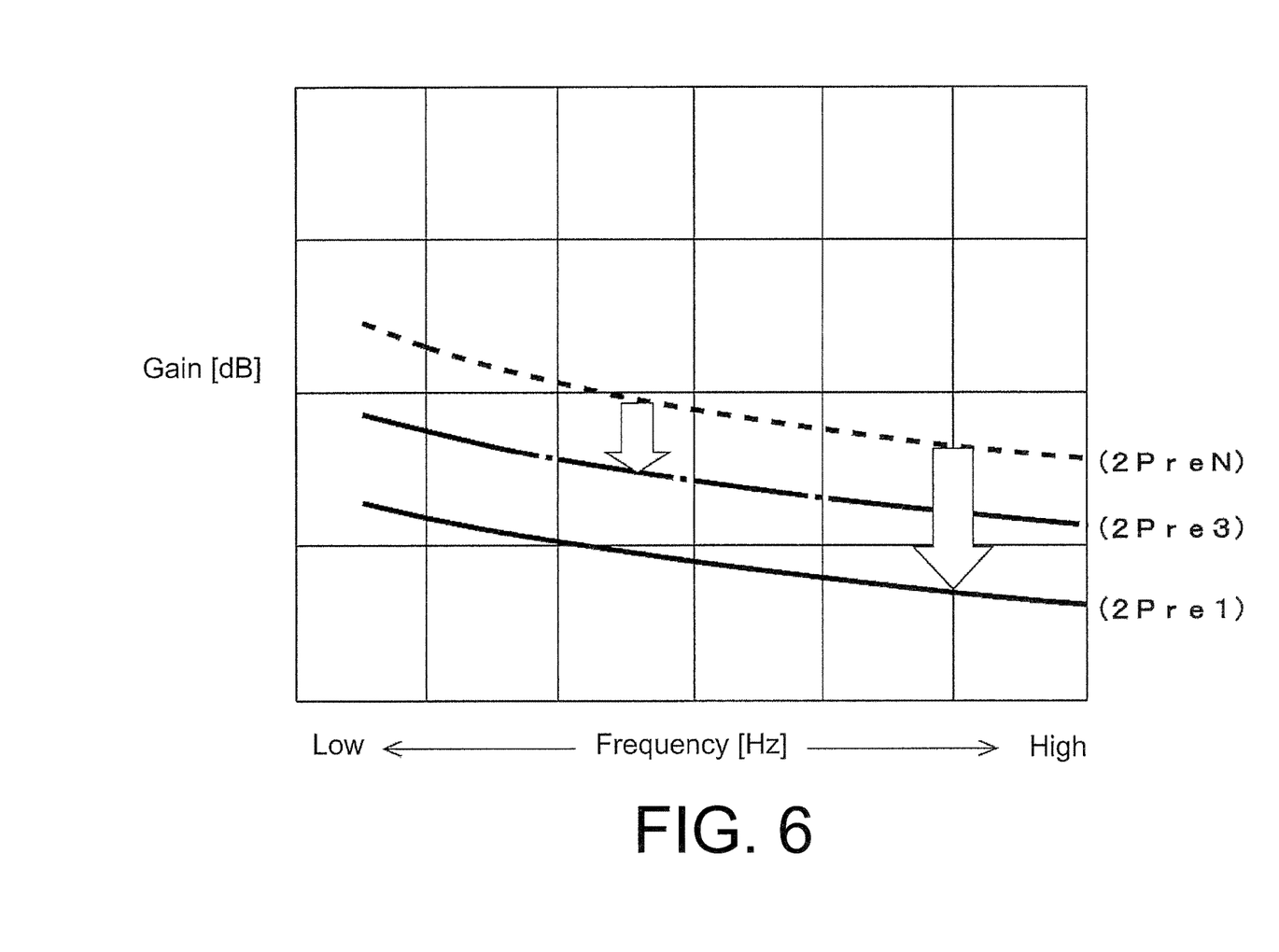
FIG. 6 is an explanatory diagram showing frequency transmission characteristics on the downstream side from a second clutch in the case where the vehicle is started at the second speed stage.

FIG. 6 is an explanatory diagram showing frequency transmission characteristics on the downstream side from a second clutch C2 when the vehicle 1 is started at the second speed stage.

This explanatory diagram indicates a graph of every frequency showing how much the frequency generated at the time of having fastened the second clutch C2 is amplified or attenuated in the second drive system located on the downstream side of the second clutch C2 before being transmitted, depending on presence or absence of the pre-shift. To be specific, for example, the ratio (gain) between the torque data (input torque signal) for every time with respect to the outer main shaft OMS close to the second clutch C2 and the torque data (output torque signal) for every time with respect to the drive shaft is converted to the gain for every frequency by an FFT (fast fourier transform). Herein, the gain is represented by a common logarithm.

Further, a solid line in the drawing represents a gain curve relating to a frequency transmission characteristic of the second drive system at the time of being pre-shifted to the first speed stage thereby to be started at the second speed (hereinafter, referred also to as 2Pre1). Moreover, a chain line in the drawing represents a gain curve relating to the frequency transmission characteristic of the second drive system at the time of being pre-shifted to the third speed stage thereby to be started at the second speed (hereinafter, referred also to as 2Pre3). In addition, a dotted line in the drawing represents a gain curve relating to the frequency transmission characteristic of the second drive system at the time of being started at the second speed without being pre-shifted (hereinafter, referred also to as 2PreN).

Further, for convenience of illustration, the illustration with respect to each of the characteristic frequencies (characteristic values) of the second drive system in the 2PreN, 2Pre3 or 2Pre1 is omitted. Accordingly, each of the gain curves is illustrated with respect to only a partial band of higher frequency range than the characteristic vibration frequency.

As apparent from FIG. 6, in the case of being pre-shifted to the first speed stage or the third speed stage, each of the gain curves of the 2Pre1 and 2Pre3 is located below the gain curve of the 2PreN in the higher frequency range than the characteristic vibration frequency. This is because, in the case of being pre-shifted to the first speed stage or the third speed stage, the characteristic vibration frequency of the second drive system of the 2Pre1 or the 2pre3 is shifted to a lower frequency range than the characteristic vibration frequency of the 2PreN. To put it briefly, in the case of being pre-shifted to the first speed stage or the third speed stage and being started at the second speed stage, the frequency generated at the time of fastening the second clutch C2 is attenuated in the higher frequency range than each of the characteristic frequencies.

Further, it is apparent from FIG. 6 that, in the case of being pre-shifted to the first speed stage in comparison with the case of being pre-shifted to the third speed stage, the frequency generated at the time the second clutch C2 is fastened is attenuated larger. To put it briefly, in the case of being pre-shifted to the first speed stage, the frequency generated at the time the second clutch C2 is fastened can be attenuated larger.

Figure 7A:
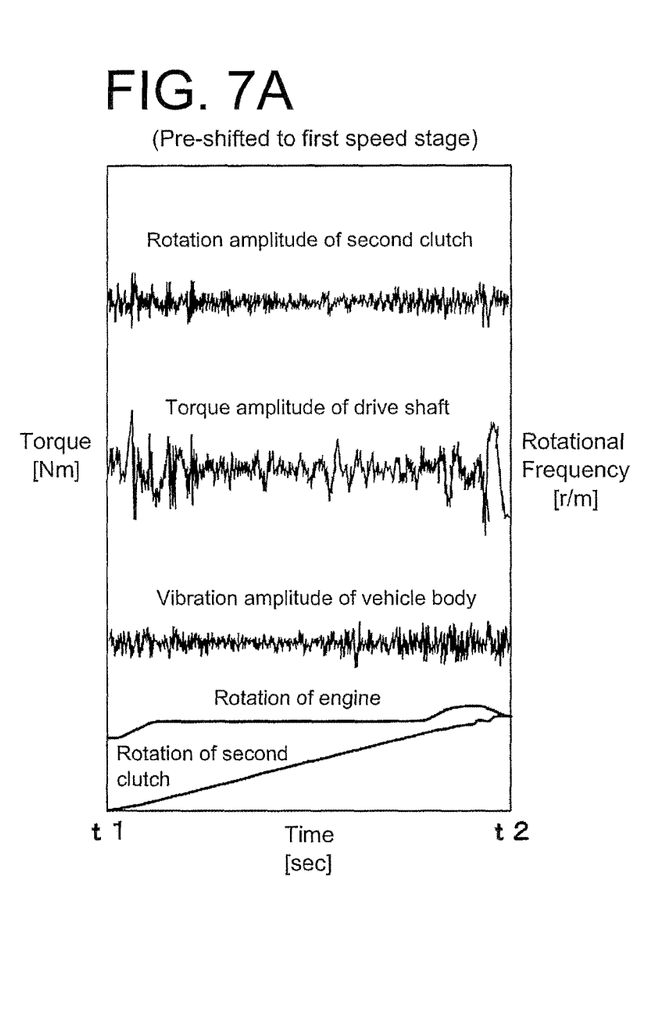
FIGS. 7A and 7B are explanatory diagrams indicating a time chart of vibrations of a vehicle body in the case where the vehicle is started at the second speed stage.
Figure 7B:
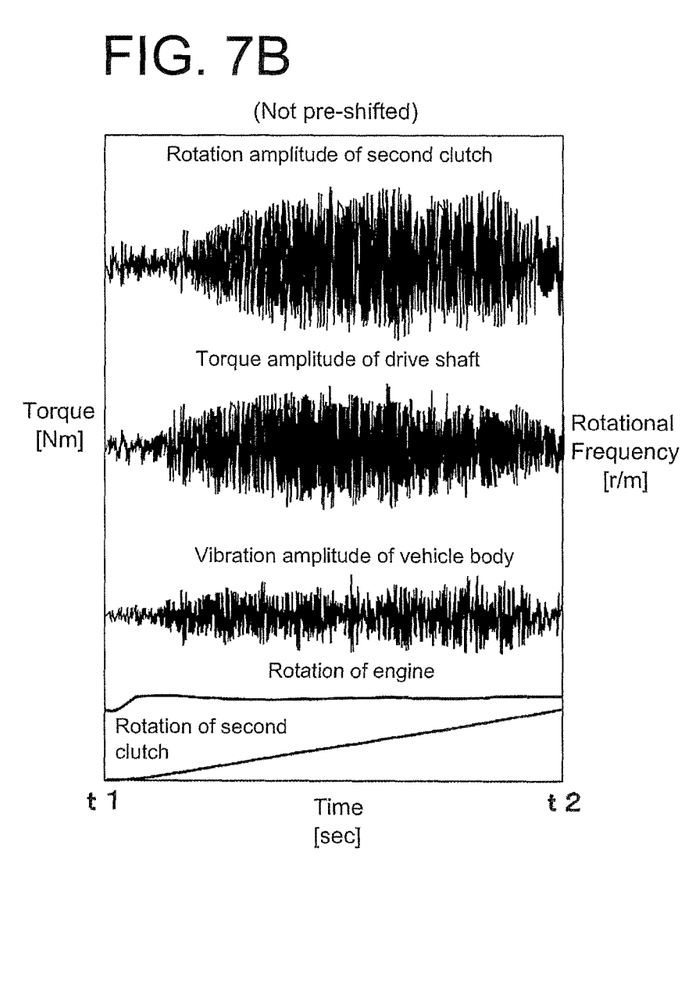

FIGS. 7A and 7B are explanatory diagrams indicating a time chart of vibrations of the vehicle body in the case where the vehicle 1 is started at the second speed stage. In addition, FIG. 7A is the time chart of the vibrations of the vehicle body in the case where the vehicle 1 is started at the second speed stage in a state of being pre-shifted to the first speed stage, and FIG. 7B is the time chart of the vibrations of the vehicle body in the case of being not pre-shifted.

Herein, as described above, as the data of the frequency of the vehicle body, each of the time charts of the rotation amplitude of the second clutch C2, the torque amplitude of the drive shafts 6L, 6R and the vibration amplitude of the vehicle body is represented.

As shown in FIG. 7A, when the second clutch C2 starts to be fastened at time t1, the drive force (rotation) from the engine 2 starts to be transmitted to the drive shafts 6L, 6R. At the same time, the vibration generated at the time of fastening the second clutch C2 is superposed on the drive force from the engine, and the drive force is transmitted, while being rotationally fluctuated, to the drive shafts 6L, 6R. Then, the second clutch C2 is completely fastened at time t2, and the rotational frequency of the second clutch C2 is coincident with the rotational frequency of the engine.

When looking at the rotation amplitude (range of vibration) from the time t1 to the time t2 of FIG. 7A, it is apparent that the rotation amplitude is remarkably attenuated in comparison with the case of being not pre-shifted in FIG. 7B. Similarly, when looking at the torque amplitude (range of vibration) of the drive shafts 6L, 6R from the time t1 to the time t2, it is apparent that the torque amplitude is remarkably attenuated in comparison with the case of being not pre-shifted in FIG. 7B. To put it briefly, it is found that, by being pre-shifted to the first speed stage, the rotational fluctuation of the drive force generated at the time the second clutch C2 is fastened is attenuated and transmitted to the drive shafts 6L, 6R. Consequently, the amplitude of the vehicle body vibration in the case of being pre-shifted to the first speed stage is reduced by a large margin in comparison with the case of being not pre-shifted.

In addition, the above described facts apply similarly to the case where the vehicle 1 is started by selecting one driving gear of the odd number shift stage and fastening the first clutch C1. In this case, the speed change gear to be pre-shifted to the first input shaft is the second speed driving gear 42 or the fourth speed driving gear 44 arranged on the secondary shaft SS.

In this case, the second clutch C2 corresponds to the above-mentioned first connection and disconnection means, and the first clutch C1 corresponds to the above-mentioned second connection and disconnection means. Further, the secondary shaft SS corresponds to the above-mentioned first input shaft, and the inner main shaft IMS corresponds to the above-mentioned second input shaft. Furthermore, the even number shift stage composed of the second speed driving gear 42, the fourth speed driving gear 44 and the sixth speed driving gear 46 corresponds to the above-mentioned first gear group, and the odd number shift stage composed of the first speed driving gear 41, the third speed driving gear 43, the fifth speed driving gear 45 and the seventh speed driving gear 47 corresponds to the above-mentioned second gear group. Moreover, the fourth-sixth speed synchromesh mechanism 83 and the second speed synchromesh mechanism 84 correspond to the above-mentioned first synchronous engagement mechanism, and the fifth-seventh speed synchromesh mechanism 81, the third speed synchromesh mechanism 82 and the brake mechanism 41 correspond to the above-mentioned second synchronous engagement mechanism.

Figure 8:
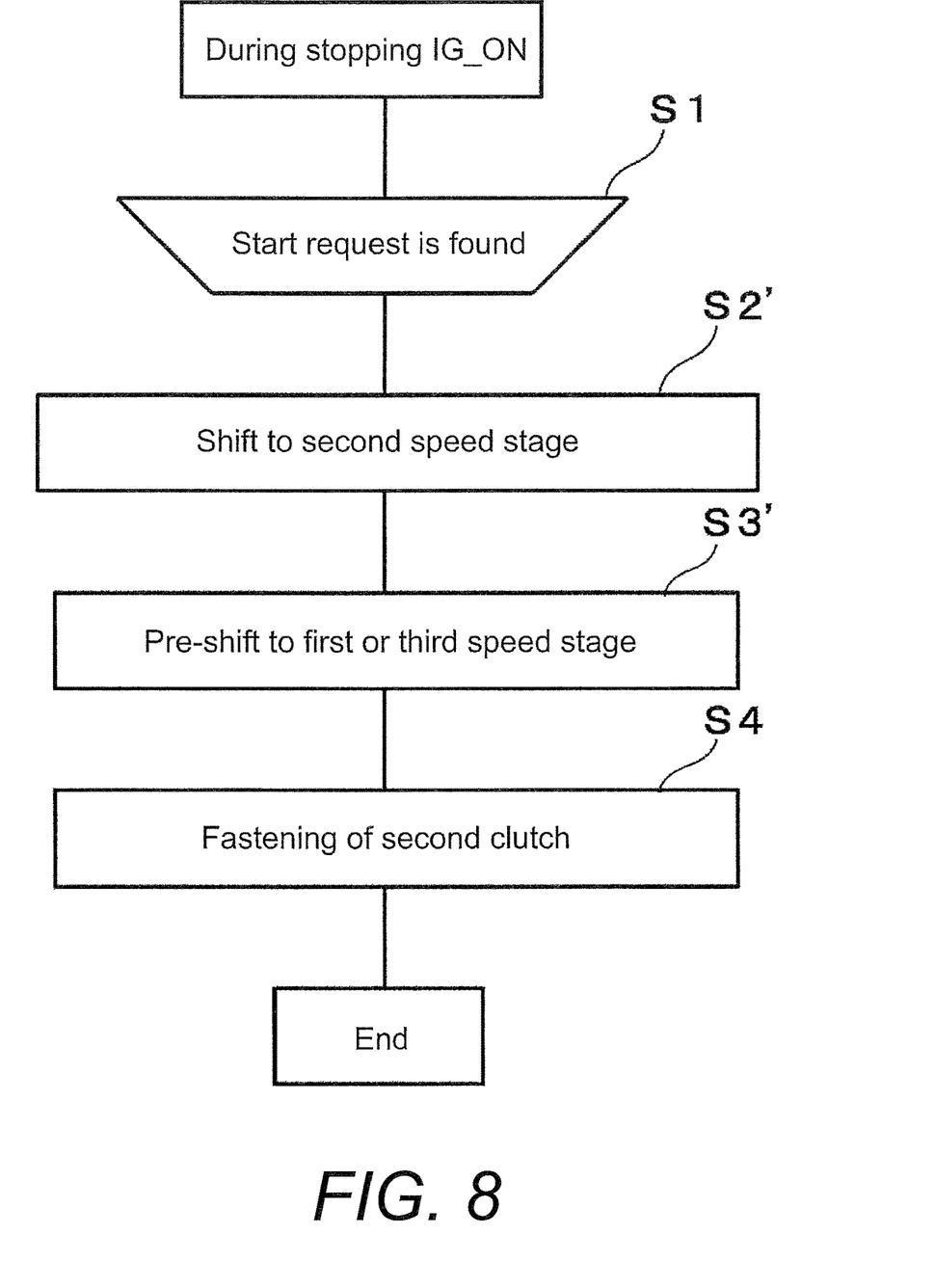
FIG. 8 is a flow chart indicating the start control when starting the vehicle at the second speed stage from the stop state thereof, in accordance with another embodiment of the present invention.

Although an example of the embodiment of the present invention has been explained with reference to the drawings, the embodiment of the present invention is not limited to the above embodiment. Various technical changes and modifications may be made in the invention without changing the essential points of the technical characteristic thereof. For example, with respect to the timing of the pre-shift as shown in FIG. 8, the pre-shift to the first speed stage or the third speed stage may be performed after having been pre-shifted to the second speed stage. In other words, in FIG. 3, the step S2 may be executed after having executed the step S3.

Further, the pre-shift to the first speed stage or the third speed stage may be performed while fastening the second clutch C2.

Figure 9:
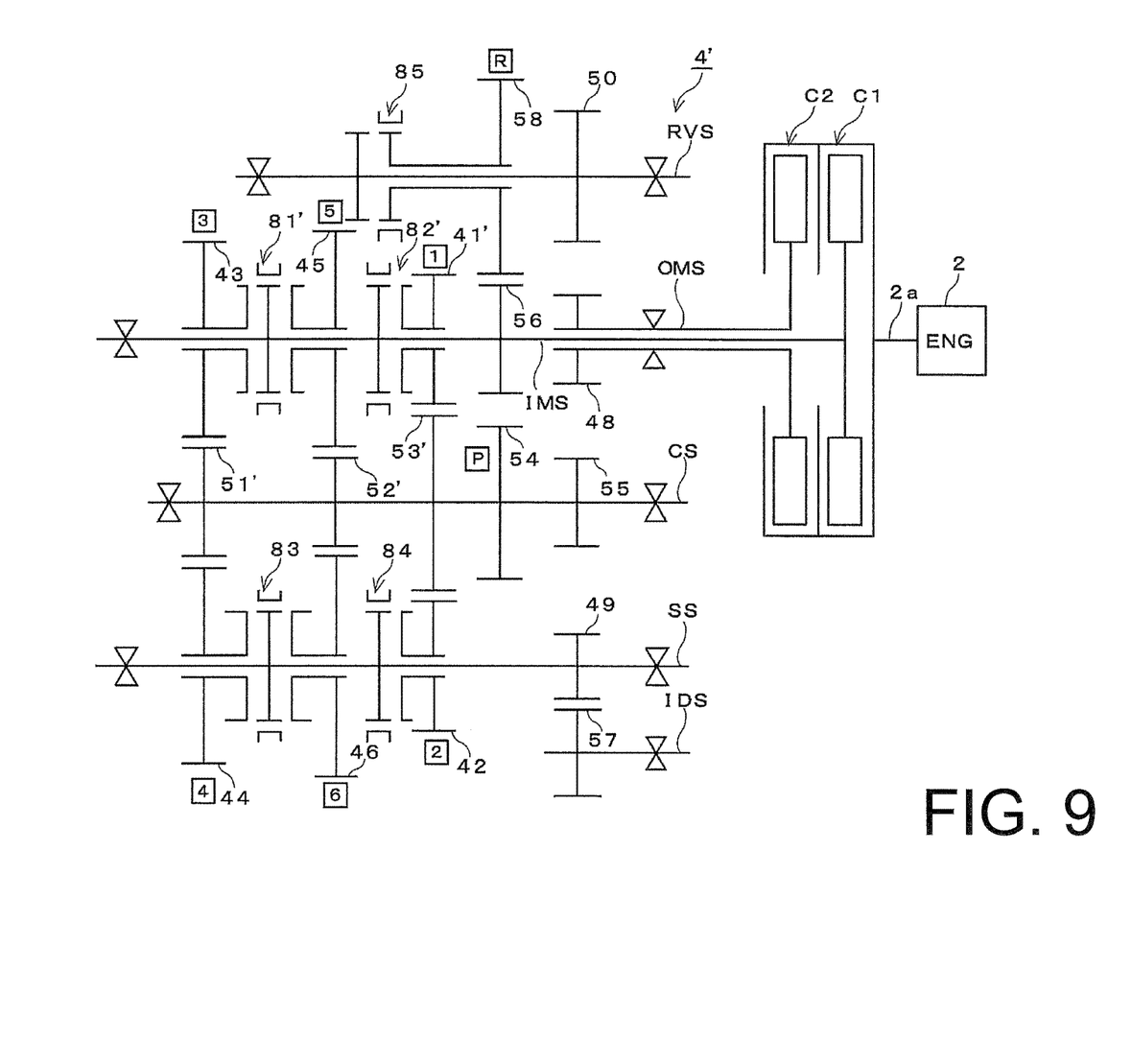
FIG. 9 is a skeleton diagram of the transmission in accordance with another embodiment of the present invention.

Further, as shown in FIG. 9, the present invention may be applied similarly to a conventional dual clutch type transmission 4' in which the motor 3 is not connected to the inner main shaft IMS. In this case, the planetary gear mechanism 70 and the brake mechanism 41 in addition to the motor 3 are dispensed with. Since these components are not required, the arrangement of the speed change gears on the inner main shaft IMS is changed, from the transmission 4, so as to be arranged in the order of the third speed driving gear 43, the five speed driving gear and a first speed driving gear 41' from the left.

With the above change, changes relative to the transmission 4 are made from the fifth-seventh speed synchromesh mechanism 81 to a third-fifth speed synchromesh mechanism 81', from the third speed synchromesh mechanism 82 to a first speed synchromesh mechanism 82', from the fourth-fifth speed driven gear 51 to a third-fourth speed driven gear 51', from the sixth-seventh speed driven gear 52 to a fifth-sixth speed driven gear 52', and from the second-third speed driven gear 53 to a first-second speed driven gear 53'. The configuration other than these changes is identical with that of the above transmission 4.

As describes above, according to the transmission 4, 4' of the present invention, when the vehicle 1 is started by one drive gear of the even number shift stage or the odd number shift stage, the vibration generated in the vehicle 1 attendant on the fastening of the second clutch C2 or the first clutch C1 can be properly suppressed without using the torque of the motor.

A transmission (4) according to a first aspect of the embodiment includes a drive source (2) for generating drive force to drive a vehicle (1), a first input shaft (IMS) being selectively connected to the drive source through a first connection and disconnection means (C1), a second input shaft (SS) being selectively connected to the drive source (2) through a second connection and disconnection means (C2), a first gear group (71, 43, 45, 47) including one or a plurality of driving gears provided on the first input shaft (INS) in a relatively rotatable manner, a first synchronous engagement mechanism (41, 81, 82) synchronously engaging one driving gear of the first gear group with the first input shaft selectively, a second gear group (42, 44, 46) including one or a plurality of driving gears provided on the second input shaft (SS) in a relatively rotatable manner, a second synchronous engagement mechanism (83, 84) synchronously engaging one driving gear of the second gear group with the second input shaft selectively, an output shaft (CS) on which one or a plurality of driven gears (51, 52, 53) to be engaged with each of the driving gears belonging to the first and second gear groups are provided in a relatively non-rotatable manner, and a control device (10) for controlling the first and second synchronous engagement mechanisms, wherein the control device (10) is configured to control the first synchronous engagement mechanism (41, 81, 82) so as to synchronously engage one driving gear of the first gear group (71, 43, 45, 47) with the first input shaft previously when the vehicle (1) is started by selecting one driving gear belonging to the second gear group (42, 44, 46) and by fastening the second connection and disconnection means (2).

With the above configuration, since one driving gear belonging to the first gear group (71, 43, 45, 47) is synchronously engaged, previously, (pre-shifted) with the first input shaft (IMS) when the vehicle is started by one driving gear belonging to the second gear group (42, 44, 46), a large part of the inertia moment (inertia) of a drive system (hereinafter, referred also to as a first drive system) in relation to the first input shaft located on the downstream side of the first connection and disconnection means (C1) becomes load inertia relative to a drive system (hereinafter, referred also to as a second drive system) in relation to the second input shaft (SS). To put it briefly, when one driving gear belonging to the first gear group (71, 43, 45, 47) is pre-shifted to the first input shaft (IMS), the load inertia relative to the second drive system is increased.

With increase of the load inertia relative to the second drive system, a characteristic vibration frequency in relation to a frequency transmission characteristic (input/output characteristics concerning frequency) of the second drive system moves (is shifted) to a low frequency range. When the characteristic vibration frequency is shifted to the low frequency range, a gain is reduced in a higher frequency range than the characteristic vibration frequency. When the gain is reduced, the rotational fluctuation of the drive force attendant on the fastening of the second connection and disconnection means (C2) is attenuated properly and transmitted to drive shafts (6L, 6R.). Therefore, the torque fluctuation of the drive shafts (6L, 6R) can be decreased. As a result, the vibration generated in a vehicle body (1) attendant on the fastening of the second connection and disconnection means (C2) can be properly suppressed at the time the vehicle (1) is started by one driving gear belonging to the second gear group (42, 44, 46).

According to a second aspect of the embodiment, the control device (10) is configured to control the first synchronous engagement mechanism (41, 81, 82) such that the driving gear of a lowest speed stage among the driving gears belonging to the first gear group (71, 43, 45, 47) is synchronously engaged with the first input shaft (IMS) previously when the vehicle (1) is started by selecting one driving gear belonging to the second gear group (42, 44, 46) and by fastening the second connection and disconnection means (C2).

With this configuration, since the driving gear of the lowest speed stage among the driving gears belonging to the first gear group (71, 43, 45, 47) is synchronously engaged, previously, with the first input shaft (IMS), the load inertia relative to the second drive system becomes largest. When the load inertia relative to the second drive system becomes largest, a shift amount of the characteristic vibration frequency becomes largest, and a reduction amount of the gain also becomes largest. Therefore, the rotational fluctuation of the drive force attendant on the fastening of the second connection and disconnection means (C2) is attenuated properly, so that the torque fluctuation of the drive shafts (6L, 6R) can be decreased. As a result, the vibration generated in the vehicle body (1) attendant on the fastening of the second connection and disconnection means (C2) can be properly suppressed at the time the vehicle (1) is started by one driving gear belonging to the second gear group (42, 44, 46).

According to a third aspect of the embodiment, the control device (10) is configured to control the first synchronous engagement mechanism (41, 81, 82) such that the driving gear belonging to the first gear group (71, 43, 45, 47) is synchronously engaged, previously, with the first input shaft (IMS) before the second connection and disconnection means (C2) is completely fastened.

With the above configuration, since the timing at which the driving gear belonging to the first gear group (71, 43, 45, 47) is synchronously engaged with the first input gear (IMS) is before the second connection and disconnection means (C2) starts to be fastened or while the second connection and disconnection means (C2) is fastened, the rotational fluctuation of the drive force attendant on the fastening of the second connection and disconnection means (C2) can be attenuated properly. As a result, the vibration generated in the vehicle body (1) attendant on the fastening of the second connection and disconnection means (C2) can be properly suppressed at the time the vehicle (1) is started by one driving gear belonging to the second gear group (42, 44, 46).

According to a fourth aspect of the embodiment, a motor (3) which is capable of driving the first input shaft (INS) is connected to the first input shaft.

With the above configuration, since the motor (3) is connected to the first input shaft (IMS), the inertia of the motor (3) is added to the inertia of the first drive system. Accordingly, in the case where one driving gear belonging to the first gear group (71, 43, 45, 47) is pre-shifted to the first input gear (IMS), the load inertia relative to the second drive system becomes larger than the case where the motor (3) is not connected. As a result, the shift amount of the characteristic vibration frequency to the low frequency range and the reduction amount of the gain with respect to the second drive system each become larger than the case where the motor (3) is not connected. Therefore, when the vehicle (1) is started by one driving gear belonging to the second gear group (42, 44, 46), the vibration generated in the vehicle body (1) attendant on the fastening of the second connection and disconnection means (C2) can be properly suppressed.

According to a fifth aspect of the embodiment, a planetary gear mechanism (70) is connected to the motor (3). A sun gear (71) of the planetary gear mechanism is rotated integrally with a rotor (3a) of the motor (3), and a carrier (73) is rotated integrally with one driving gear belonging to the first gear group (71, 43, 45, 47). Further, a rotation of a ring gear (75) is restrained selectively by the first synchronous engagement mechanism (41, 81, 82).

With the above configuration, the sun gear (71) of the planetary gear mechanism (70) is rotated integrally with the rotor (3a) of the motor (3), and the carrier (73) is rotated integrally with one driving gear belonging to the first gear group (71, 43, 45, 47). Further, the rotation of the ring gear (75) is restrained selectively by the first synchronous engagement mechanism (41, 81, 82). Therefore, in the case where one driving gear belonging to the first gear group (71, 43, 45, 47) is pre-shifted to the first input shaft (IMS), the inertia of the planetary gear mechanism (70) is added to the first drive system as the load inertia in addition to the inertia of the motor (3). Thus, the load inertia relative to the second drive system becomes larger. As a result, when the vehicle (1) is started by one driving gear belonging to the second gear group (42, 44, 46), the vibration generated in the vehicle body (1) attendant on the fastening of the second connection and disconnection means (C2) can be properly suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A transmission comprising:
   a drive source for generating drive force to drive a vehicle;
   a first input shaft being selectively connected to the drive source through a first connection and disconnection means;
   a second input shaft being selectively connected to the drive source through a second connection and disconnection means;
   a first gear group including one or a plurality of driving gears provided on the first input shaft in a relatively rotatable manner;
   a first synchronous engagement mechanism synchronously engaging one driving gear of the first gear group with the first input shaft selectively;
   a second gear group including one or a plurality of driving gears provided on the second input shaft in a relatively rotatable manner;
   a second synchronous engagement mechanism synchronously engaging one driving gear of the second gear group with the second input shaft selectively;
   an output shaft on which one or a plurality of driven gears to be engaged with each of the driving gears belonging to the first and second gear groups are provided in a relatively non-rotatable manner; and
   a control device for controlling the first and second synchronous engagement mechanisms;
   wherein the control device is configured to, in response to a determination that the vehicle is to be started from a stop state, control the first synchronous engagement mechanism so as to synchronously engage one driving gear of the first gear group with the first input shaft before selecting one driving gear of the second gear group and engaging the second connection and disconnection means such that the vehicle is started from the stop state with the selected one driving gear of the second gear group engaged.

2. The transmission according to claim 1, wherein the control device is configured to control the first synchronous engagement mechanism such that the driving gear of a lowest speed stage among the driving gears belonging to the first gear group is synchronously engaged with the first input shaft when the vehicle is started before selecting one driving gear of the second gear group and engaging the second connection and disconnection means.

3. The transmission according to claim 1, wherein the control device is configured to control the first synchronous engagement mechanism such that the driving gear belonging to the first gear group is synchronously engaged with the first input shaft before the second connection and disconnection means is completely engaged.

4. The transmission according to claim 1, further comprising a motor being capable of driving the first input shaft, wherein the motor is connected to the first input shaft.

5. The transmission according to claim 4, further comprising a planetary gear mechanism being connected to the motor, wherein a sun gear of the planetary gear mechanism is rotated integrally with a rotor of the motor, and a carrier thereof is rotated integrally with one driving gear belonging to the first gear group, and wherein a rotation of a ring gear is restrained selectively by the first synchronous engagement mechanism.

6. The transmission according to claim 1, wherein the determination that the vehicle is to be started from the stop state includes determining that a current shift position is a traveling position.

7. A transmission comprising:
a drive source to generate drive force to drive a vehicle;
a first input shaft to be connected to the drive source through a first connection and disconnection device;
a second input shaft to be connected to the drive source through a second connection and disconnection device;
a first gear group including at least one first driving gear provided on the first input shaft to be relatively rotatable with respect to the first input shaft;
a first synchronous engagement mechanism to synchronously engage one of the at least one first driving gear with the first input shaft;
a second gear group including at least one second driving gear provided on the second input shaft to be relatively rotatable with respect to the second input shaft;
a second synchronous engagement mechanism to synchronously engage one of the at least one second driving gear with the second input shaft;
an output shaft on which at least one driven gear is provided to be rotatable together with the output shaft, the at least one driven gear being engaged with each of the at least one first driving gear in the first gear group and with each of the at least one second driving gear in the second gear group; and
circuitry configured to, in response to a determination that the vehicle is started from a stop state,
control the first synchronous engagement mechanism to synchronously engage the one of the at least one first driving gear with the first input shaft before selecting the one of the at least one second driving gear and connecting the second input shaft to the drive source through the second connection and disconnection device so as to move the vehicle from the stop state with the at least one second driving gear engaged.

8. The transmission according to claim 7, wherein
the at least one first driving gear includes a driving gear of a lowest speed stage, and
the circuitry is configured to control the first synchronous engagement mechanism such that the driving gear of the lowest speed stage is synchronously engaged with the first input shaft before selecting the one of the at least one second driving gear and connecting the second input shaft to the drive source through the second connection and disconnection device so as to move the vehicle.

9. The transmission according to claim 7, wherein the circuitry is configured to control the first synchronous engagement mechanism such that the at least one first driving gear in the first gear group is synchronously engaged with the first input shaft before the second connection and disconnection device is completely engaged.

10. The transmission according to claim 7, further comprising:
a motor being capable of driving the first input shaft, wherein
the motor is connected to the first input shaft.

11. The transmission according to claim 10, further comprising:
a planetary gear mechanism being connected to the motor, wherein
a sun gear of the planetary gear mechanism is rotated integrally with a rotor of the motor, and a carrier thereof is rotated integrally with the at least one first driving gear in the first gear group, and
a rotation of a ring gear is restrained selectively by the first synchronous engagement mechanism.

12. The transmission according to claim 7, wherein the determination that the vehicle is to be started from the stop state includes determining that a current shift position is a traveling position.

* * * * *